US011416434B2

(12) United States Patent
Vijayakumar et al.

(10) Patent No.: US 11,416,434 B2
(45) Date of Patent: Aug. 16, 2022

(54) SYSTEM AND METHOD FOR RE-ENUMERATING A SECURED DRIVE DYNAMICALLY WITHIN AN OPERATING SYSTEM

(71) Applicant: DELL PRODUCTS, LP, Round Rock, TX (US)

(72) Inventors: Gobind Vijayakumar, Trichy (IN); Krishnaprasad Koladi, Bengaluru (IN); Chandrashekar Nelogal, Round Rock, TX (US); Syama Poluri, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/107,209

(22) Filed: Nov. 30, 2020

(65) Prior Publication Data
US 2022/0171733 A1 Jun. 2, 2022

(51) Int. Cl.
| | |
|---|---|
| *G06F 13/40* | (2006.01) |
| *G06F 21/57* | (2013.01) |
| *G06F 21/62* | (2013.01) |
| *G06F 21/44* | (2013.01) |
| *G06F 21/51* | (2013.01) |

(52) U.S. Cl.
CPC ...... *G06F 13/4081* (2013.01); *G06F 13/4022* (2013.01); *G06F 21/44* (2013.01); *G06F 21/51* (2013.01); *G06F 21/575* (2013.01); *G06F 21/62* (2013.01); *G06F 21/6218* (2013.01)

(58) Field of Classification Search
CPC ............. G06F 13/4081; G06F 13/4022; G06F 21/575; G06F 21/6218; G06F 21/62; G06F 21/44; G06F 21/51
See application file for complete search history.

(56) References Cited

U.S. PATENT DOCUMENTS

| | | | |
|---|---|---|---|
| 9,720,700 B1* | 8/2017 | Brown | G06F 13/4068 |
| 9,760,730 B2 | 9/2017 | Vajravel | |
| 10,097,534 B2 | 10/2018 | Vajravel et al. | |
| 10,608,819 B1* | 3/2020 | Brown | G06F 21/78 |
| 2006/0234797 A1* | 10/2006 | Davis | G06F 21/71 |
| | | | 463/43 |
| 2009/0319782 A1* | 12/2009 | Lee | G06F 21/575 |
| | | | 713/156 |
| 2011/0010470 A1* | 1/2011 | Hulbert | H04L 63/0853 |
| | | | 710/13 |
| 2013/0117488 A1* | 5/2013 | Perry | G11B 33/08 |
| | | | 710/304 |

(Continued)

*Primary Examiner* — Glenn A. Auve
(74) *Attorney, Agent, or Firm* — Larson Newman, LLP (57) ABSTRACT

An information handling system includes a host bus adaptor (HBA) that receives a secured media device, and a processor that executes an operating system. In response to the operating system being booted, the baseboard management controller detects a hot plug insertion of the secure media device into the information handling system. The baseboard management controller retrieves a key for the secured media device. In response to the retrieving of the key, the baseboard management controller unlocks the secured media device. The baseboard management controller triggers an enumeration of the secured media device. In response to the trigger, a host bus adaptor driver of the processor enumerates the secured media device.

20 Claims, 6 Drawing Sheets

(56) References Cited

U.S. PATENT DOCUMENTS

| | | | | |
|---|---|---|---|---|
| 2013/0132614 A1* | 5/2013 | Bajpai | ............... | G06F 13/4286 |
| | | | | 710/10 |
| 2017/0344294 A1* | 11/2017 | Mishra | ............... | G06F 3/0659 |
| 2018/0173664 A1* | 6/2018 | Am | ............... | G06F 13/24 |
| 2019/0042805 A1* | 2/2019 | Desai | ............... | G06F 21/44 |
| 2019/0045358 A1* | 2/2019 | Ahmed | ............... | H04W 12/06 |
| 2019/0149341 A1* | 5/2019 | Robison | ............... | H04L 9/3268 |
| | | | | 713/156 |
| 2021/0157760 A1* | 5/2021 | Kaler | ............... | H04L 9/3234 |

* cited by examiner

SYSTEM AND METHOD FOR RE-ENUMERATING A SECURED DRIVE DYNAMICALLY WITHIN AN OPERATING SYSTEM

FIELD OF THE DISCLOSURE

The present disclosure generally relates to information handling systems, and more particularly relates to re-enumerating a secured drive dynamically within an operating system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a host bus adaptor (HBA), a processor, and a baseboard management controller. The HBA may receive a secured media device, and the processor may execute an operating system. In response to the operating system being booted, the baseboard management controller may detect a hot plug insertion of the secure media device into the information handling system. The baseboard management controller may retrieve a key for the secured media device. In response to the retrieving of the key, the baseboard management controller may unlock the secured media device. The baseboard management controller may trigger an enumeration of the secured media device. In response to the trigger, a host bus adaptor driver of the processor may enumerate the secured media device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
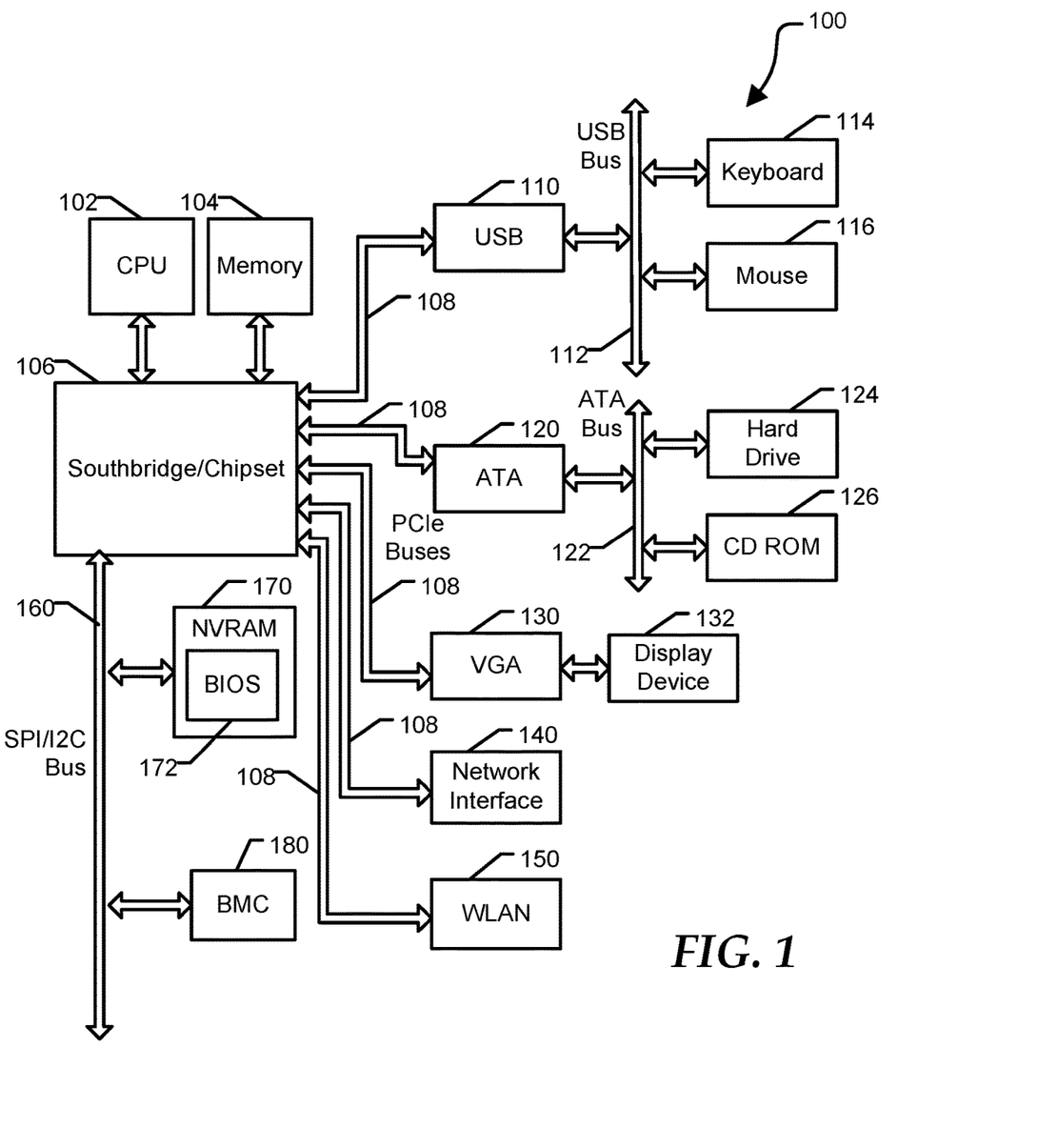
FIG. 1 is a block diagram of a general information handling system according to an embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a southbridge/chipset 106, one or more PCIe buses 108, a universal serial bus (USB) controller 110, a USB 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of southbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

In an example, information handling system 100 may be any suitable device including, but not limited to, information handling system 100 and servers 112, 114, and 116 of FIG. 1. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
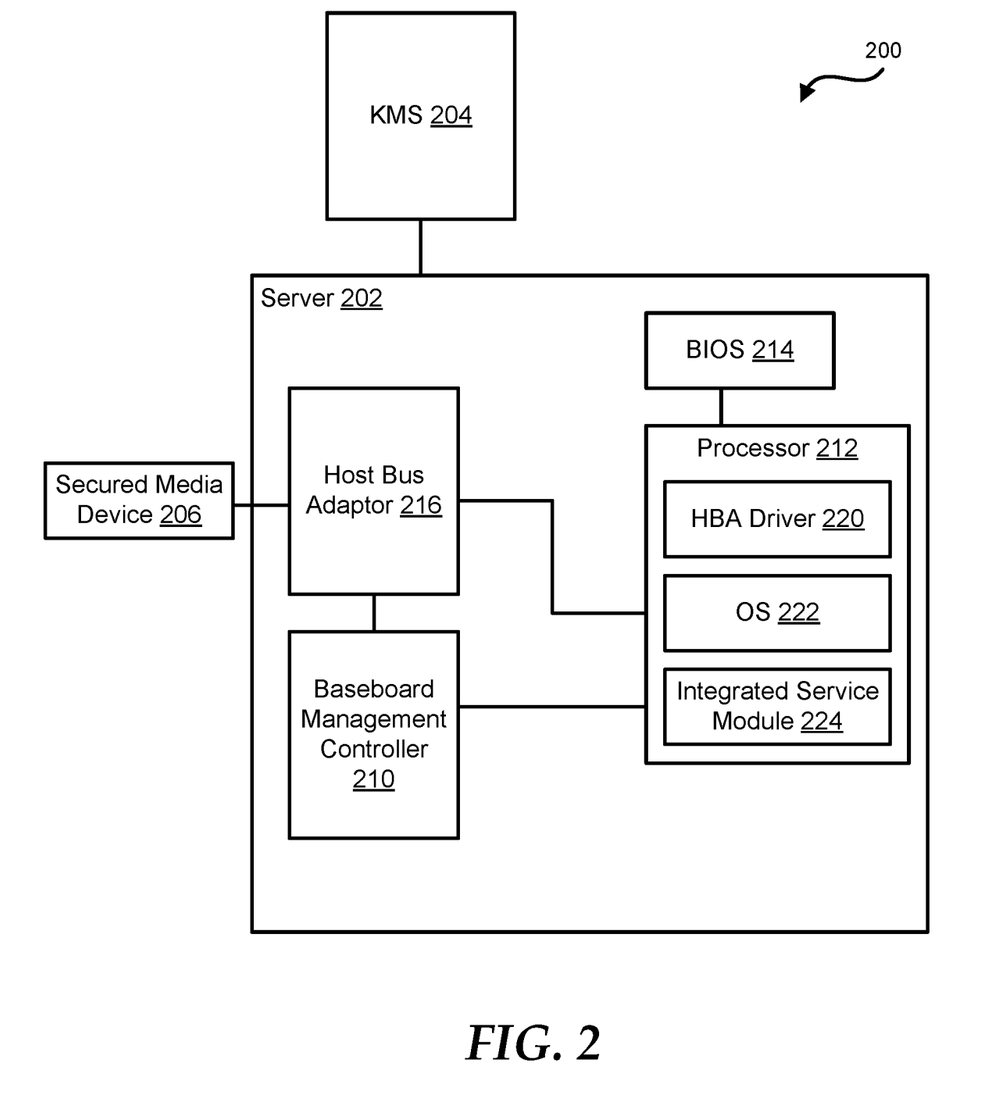
FIG. 2 is a diagram of a portion of an information handling system according to at least one embodiment of the present disclosure.

FIG. 2 illustrates an information handling system 200 including a server 202, a key management system (KMS) 204, and a secured media device 206 according to at least one embodiment of the present disclosure. Server 202 includes a baseboard management controller (BMC) 210, a processor 212, a basic input/output system (BIOS) 214, and a host bus adaptor (HBA) 216. Processor 212 includes a HBA driver 220, an operating system (OS) 222, and an integrated service module (iSM) 224. In an example, secured media device 206 may be any suitable type of device including, but not limited to, a self encrypting drive, such as a serial attached small computer system interface (SAS) drive, a serial advanced technology attachment (SATA) drive, a non-volatile memory express (NVMe) driver, or the like. While one HBA 216 one secured media device 206 are illustrated within server 202, the server may include any suitable number of HBAs and secured media devices without varying from the scope of this disclosure. For example, the operations disclosed herein may be performed on any number of secured media devices 206 without varying from the scope of this disclosure. In certain examples, information handling system 200 may perform any suitable operations or solutions. For example, information handling system 200 may implement a data-at-rest encryption solution. In this example, information handling system 200 may be a software defined storage (SDS) environment. In an example, information handling system 200 may include additional components without varying from the scope of this disclosure.

During operation, secured media device 206 may be a locked device and may be inserted within or otherwise connected to server 202. In an example, secured media device 206 may be connected to any HBA within server 202, such as HBA 216. In response to secured media device 206 being discovered by HBA 216, the HBA may report the secured media device to OS 222 of processor 212, and the OS may in turn discover the secured media device.

In an example, BMC 210 may perform one or more operations to detect a hot plug event of secured media device 206 and to unlock the secured media device. In certain examples, BMC 210 may receive a key identification (ID) from secured media device 206. In response to retrieving the key ID, BMC 210 may communicate with KMS 204 to retrieve a corresponding password to unlock secured media device 206. In an example, BMC 210 may not immediately detect and unlock secured media device 206. In this example, OS 222 may perform a media access command to determine the presence of partition information, file system information, or other metadata on secured media device 206. However, if OS 222 performs the media access command prior to BMC 210 unlocking secured media device 206, media access command with fail, and the OS 222 may identify the secured media device as a locked device. In an example, the media access command may be any suitable command to access and retrieve data from the device including, but not limited to, a command to enumerate secured media device 206.

Previous information handling systems, do not have a mechanism to re-initialize or re-enumerate secured media device 206 even when OS 222 is notified that BMCs 210 has unlocked the secured media device. In previous information handling systems, the determination by OS 222 that secured media device 206 is failed based on the secured media device being locked, may not be resolved until server 202 is rebooted. Thus, in previous information handling systems, if OS 222 has already been booted prior to secured media device 206 being inserted within server 202, the secured media device may be determined to be failed until a re-boot of the server. This issue may result in whenever secured media device 206 is removed from server 202 and connected to another server. Information handling system 200 may be improved by BMC 210 providing a mechanism to detect and unlock secured media device 206 from OS 222 and triggering a re-discovery of the secured memory device after the OS has been booted.

In an example, BMC 210 may perform one or more operations as a key manager and to unlock secured media device 206 when the device is hot plugged into server 202. In certain examples, BMC 210 may obtain inventory of components within server 202 via sideband APIs and fetch data in response to secured memory device 206 being detected. In an example, BMC 210 may operate as a key manager to unlock and re-initialize secured media device 206, as will be described with respect to FIG. 3 below.

Figure 3:
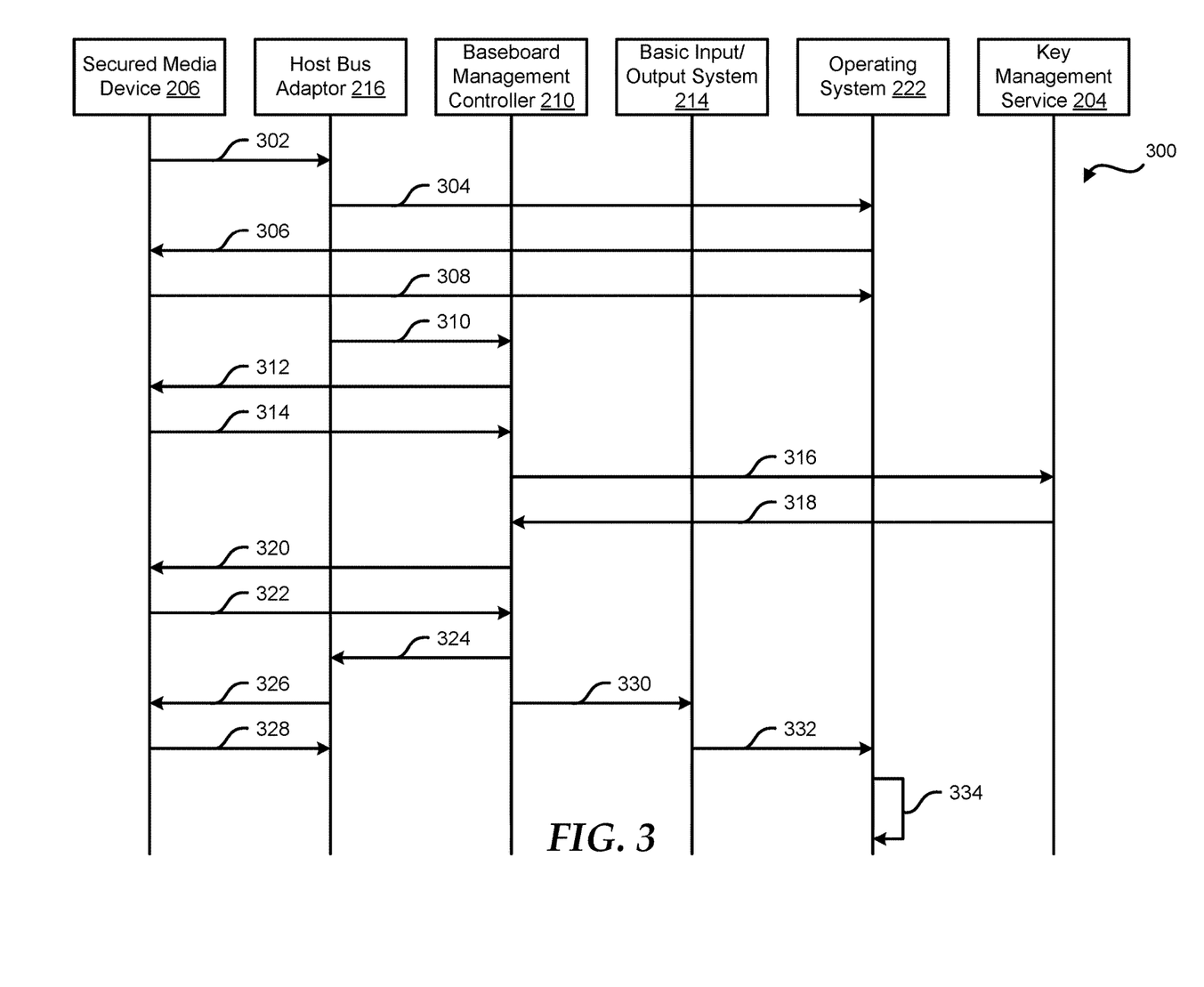
FIG. 3 is a diagram of an operation flow to enumerate a secured media drive during operation of an operating system of an information handling system according to at least one embodiment of the present disclosure.

FIG. 3 illustrates an operation flow 300 to enumerate a secured media drive during operation of an operating system of an information handling system according to at least one embodiment of the present disclosure. At step 302, secured media device 206 is inserted within server 202 and connected to HBA 216. In an example, secured media device 206 may be locked when it is first connected to HBA 216. At step 304, HBA 216 provides a notification to OS 222. In an example, the notification may indicate any suitable information including, but not limited to, secured media drive 206 being inserted within server 202. Additionally, the notification may request OS 222 perform a small computer system interface (SCSI) bus enumeration.

At step 306, OS 222 may issue a drive media access command to secured media device 206. In this situation, secured media device 206 may be locked, such that the drive media access command is rejected, and the secured media device may return a denial of access to OS 222 at step 308. At step 310, HBA 216 may notify BMC 210 that secured media device 206 has been inserted within server 202. At step 312, BMC 210 may initiate a request to retrieve a key ID from secured media device 206. At step 314, secured media device 206 may provide the key ID to BMC 210. In an example, BMC 210 may utilize the key ID to retrieve the key for secured media device 206, and the key may be utilized to unlock the device.

At step 316, BMC 210 may provide the key ID to KMS 204. In an example, KMS 204 may utilize the key ID to lookup and determine the key for secured media device 206. KMS 204 may perform the key lookup and determination in any suitable manner. In response to KMS 204 determining the key or password for secured media device 204, the KMS may provide the key to BMC 210 at step 318. At step 320, BMC 210 may provide the key and an unlock signal to secured media device 206. In response to the key being valid, secured media device 204 may unlock and provide an unlocked notification to BMC 210 at step 322.

At step 324, BMC 210 may notify HBA 216 that secured media device 206 is unlocked. In an example, the notification may be provided in any suitable operations including, but not limited to sending the notification to HBA firmware (FW) via a sideband communication. At step 326, HBA FW of HBA 216 may issue an unlock verification request to secured media device 206. In response to the unlock verification request and secured media device 206 being unlocked, the secured media device may provide an unlock verification signal to HBA 216 at step 328. Additionally, HBA 216 may also validate the notification from BMC 210. In an example, the notification from HBA 210 may be the notification that secured media device 206 had been unlocked by the BMC.

At step 330, BMC 210 may provide a system management interrupt (SMI) to BIOS 214. In an example, BMC 210 may also provide a message or otherwise provide information containing specific HBA bus/device/function (BDF) details to BIOS 214. In response to the SMI, BIOS 214 may trigger a unique SMI handler to perform one or more operations to re-enumerate secured media device 206. In an example, the SMI handler may create a bus enumeration event for the corresponding HBA 216 at step 332. In certain examples, BIOS 214 may determine the HBA 216 that corresponds to secured media device 206 based on the HBA BDF details received from BMC 210. At step 332, the bus enumeration event may cause a re-enumeration of secured media device 206 within OS 222. In an example, the re-enumeration of secured media device 206 may be performed in any suitable manner. For example, HBA FW within HBA 216 may trigger a device insertion event and provide this event to a host OS, such as OS 222. In response to the device insertion event, a HBA driver, such as HBA driver 220 of FIG. 2 within OS 222, may re-enumerate secured media device 206. Based on the re-enumeration of secured media device 206, OS 222 of processor 212 may access data stored within the secured media device.

Referring back to FIG. 2, as described above, BMC 210 may interface with KMS 204 to perform the functions of a key manager for server 202 to enable secured media 206 to be enumerated after OS 222 has been booted and current operating. Thus, BMC 210 may improve server 202 by unlocking secured media device 206 and enumerating the device after a hot plug of the device when OS 222 has already been booted and without a reset of the server.

In an example, BMC 210 and integrated service module (iSM) 224 may perform one or more operations to unlock secured media device 206 when the device is hot plugged into server 202 after a boot of OS 222. In certain examples, BMC 210 may perform actions as an interface between HBA 216 and iSM 224 to unlock and re-initialize secured media device 206, as will be described with respect to FIG. 4 below.

Figure 4:
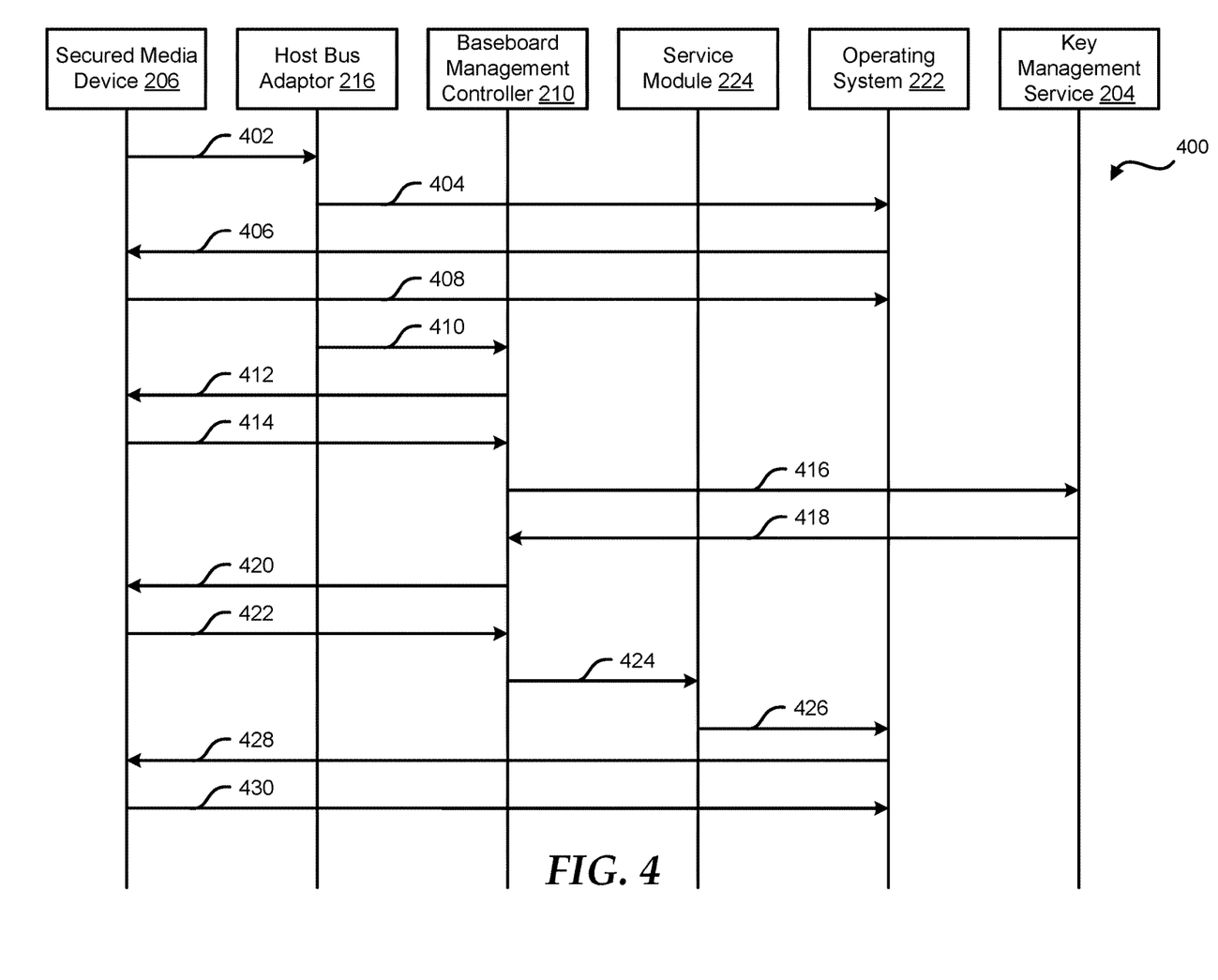
FIG. 4 is a diagram of an operation flow to perform an attach and scan operation on a secured media drive during operation of an operating system of an information handling system according to at least one embodiment of the present disclosure.

FIG. 4 illustrates an operation flow 400 to perform an attach and scan operation on secured media drive 206 during operation of OS 222 within server 202 according to at least one embodiment of the present disclosure. At step 402, secured media device 206 is inserted within server 202 and connected to HBA 216. In an example, secured media device 206 may be locked when it is first connected to HBA 216. At step 404, HBA 216 provides a notification to OS 222. In an example, the notification may indicate any suitable information including, but not limited to, secured media drive 206 being inserted within server 202. Additionally, the notification may request OS 222 perform a SCSI bus enumeration.

At step 406, OS 222 may provide a drive media access command to secured media device 206. In this situation, secured media device 206 may be locked, such that the drive media access command is rejected, and the secured media device may return a denial of access to OS 222 at step 408. At step 410, HBA 216 may notify BMC 210 that secured media device 206 has been inserted within server 202. At step 412, BMC 210 may issue a request to retrieve a key ID from secured media device 206. At step 414, secured media device 206 may provide the key ID to BMC 210. In an example, BMC 210 may utilize the key ID to retrieve the key for secured media device 206, and the key may be utilized to unlock the device.

At step 416, BMC 210 may provide the key ID to KMS 204. In an example, KMS 204 may utilize the key ID to lookup and determine the key for secured media device 206. KMS 204 may perform the key lookup and determination in any suitable manner. In response to KMS 204 determining the key or password for secured media device 204, the KMS may provide the key to BMC 210 at step 418. At step 420, BMC 210 may provide the key and an unlock signal to secured media device 206. In response to the key being valid, secured media device 204 may unlock and provide an unlocked notification to BMC 210 at step 422.

At step 424, BMC 210 may send iSM 224 a notification indicating that secured device 206 is unlocked. In certain examples, the notification may be sent via a universal serial bus (USB) network interface card (NIC) (USBNIC) within server 202. In an example, the notification may include any suitable data for identifying HBA 216 corresponding to secured media device 206. For example, the notification may include, but is not limited to, a vendor specific transmission control protocol (TCP) packet containing the HBA BDF details for HBA 216 and a drive slot location where secured media device 206 is present. Based on the data within the notification, iSM 224 may identify HBA 216 connected to secured media device 206, and identify a HBA driver, such as HBA driver 220, within OS 222 associated with the HBA.

At step 426, iSM 224 may send a control signal to HBA driver 220 of OS 222. In an example, the control signal may be any suitable control signal including, but not limited to, an input/output control (IOCTL) signal. In certain examples, the IOCTL signal may cause OS 222 to perform I/O operations for secured media device 206, and the I/O operations of IOCTL may be different than operations resulting from regular read or write calls. In an example, the IOCTL may be implemented by HBA driver 220 to perform any specific operation including, but not limited to, the HBA driver of OS 222 reinstating attach and scan operations for secured device 206 at step 428. In an example, the attach and scan operations may result in OS 222 rescanning secured media device 206 to determine whether the device is usable by the OS. At step 430, based on secured media device 206 being accessible by OS 222, the secured media device may provide a signal and/or data to the OS.

Referring back FIG. 2, BMC 202 may perform the operations described above to improve server 202 by enabling and re-enumerating secured media device 206 after OS 222 has been booted and is executed by processor 212. In an example, based on the explicit bus enumeration event, BMC 210 may cause firmware within HBA 216 to trigger a second device insertion event or notification to OS 222. In certain examples, the second device insertion event may be a virtualized insertion after the initial hot plug insertion event. The firmware of HBA 216 may also communicate with secured media device 206 to validate a drive unlock status received by BMC 210. The IOCTL signal from HBA 216 may reinstate bus re-enumeration of the bus on HBA 216 connected to secured media device 206.

Figure 5:
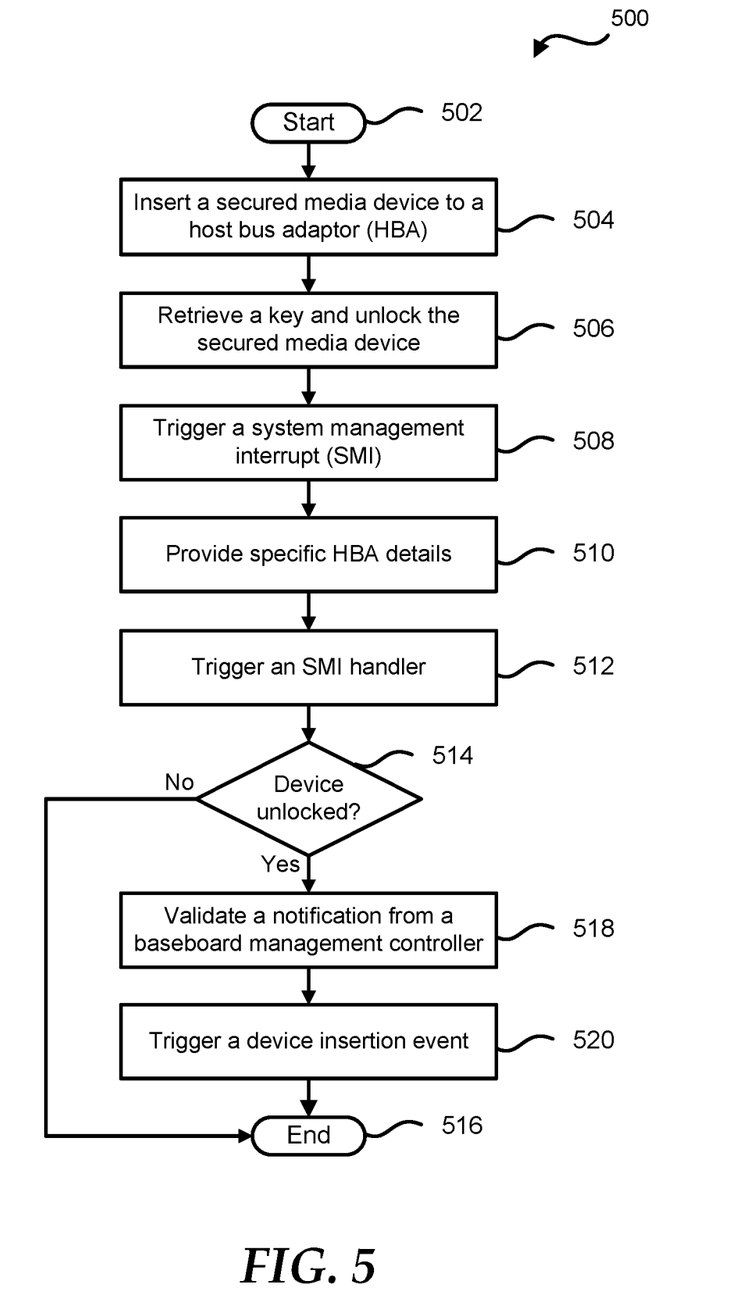
FIG. 5 is a flow diagram of a method for enumerating a secured media drive during operation of an operating system of an information handling system according to at least one embodiment of the present disclosure.

FIG. 5 is a flow diagram of a method 500 for enumerating a secured media drive during operation of an operating system of an information handling system according to at least one embodiment of the present disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 5 may be employed in whole, or in part, by information handling system 100 depicted in FIG. 1, information handling system 200 depicted in FIG. 2, or any other type of system, controller, device, module, processor, or any combination thereof, operable to employ all, or portions of, the method of FIG. 5.

At block 504, a secured media device is inserted into a server and connected to a host bus adaptor (HBA) of the server. At block 506, a key is retrieved and the secured media device is unlocked. In an example, a BMC of the server may perform any suitable operations to retrieve the key for the secured media device. For example, the BMC may receive a key ID from the secured media device, may provide the key ID to a key management system (KMS) in communication with the server. Based on the key ID, the KMS may determine the key for the secured media device and provide the key to the BMC. The BMC may utilize the key from KMS to unlock the secured media device.

At block 508, a system management interrupt (SMI) is triggered. At block 510, HBA details are provided with the SMI to the BIOS of the server. At block 512, a SMI handler is triggered. In an example, the BIOS may trigger a unique SMI handler to perform one or more operations to re-enumerate the secured media device. At block 514, a determination is made whether the secured media device is unlocked. If the secured media device is not unlocked, the method ends at block 516. If the secured media device is unlocked, a notification from the BMC is validated at block 518. At block 520, a device insertion event is triggered, and the method ends at block 516. In an example, the SMI handler may create a bus enumeration event for the corresponding HBA to trigger the device insertion event. In certain examples, the bus enumeration event may cause a re-enumeration of the secured media device. In an example, the re-enumeration of the secured media device may be performed in any suitable manner. For example, HBA FW may trigger a device insertion event and provide this event to a host OS. In response to the device insertion event, a HBA drive may re-enumerate the secured media device. Based on the re-enumeration of the secured media device, an OS 222 a processor may access data stored within the secured media device.

Figure 6:
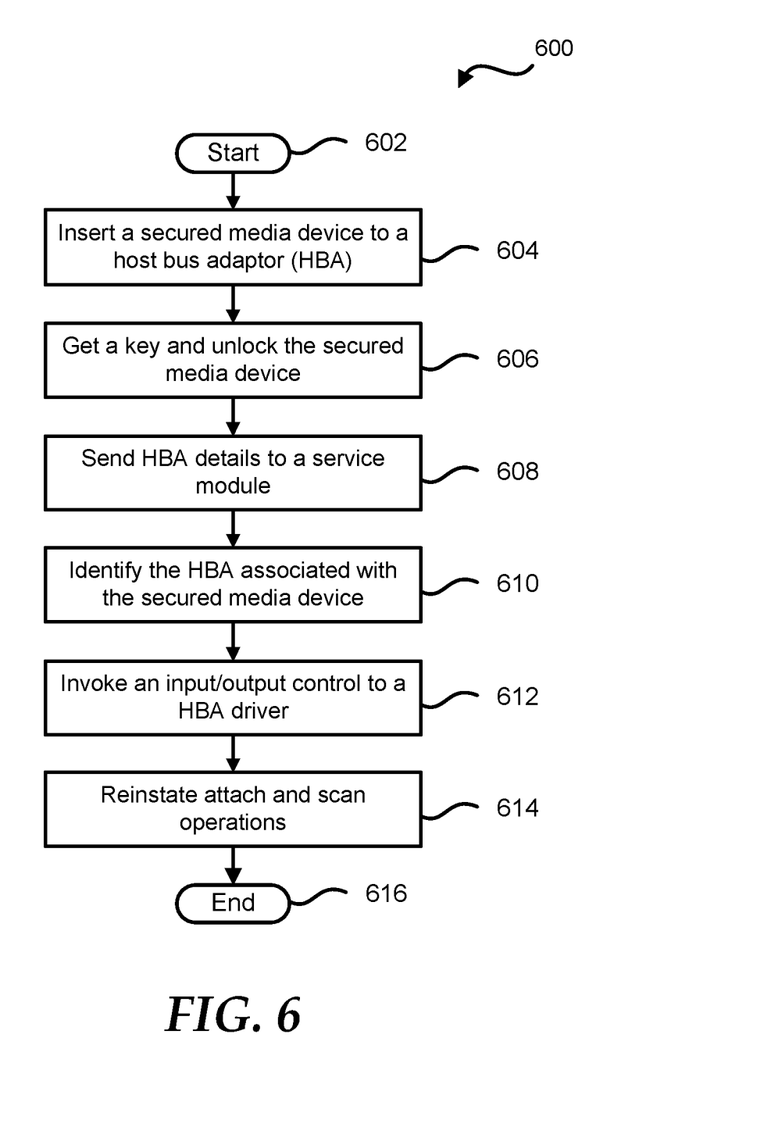
FIG. 6 is a flow diagram of a method for performing an attach and scan operation on a secured media drive during operation of an operating system of an information handling system according to at least one embodiment of the present disclosure.

FIG. 6 is a flow diagram of a method 600 for performing an attach and scan operation on a secured media drive during operation of an operating system of an information handling system according to at least one embodiment of the present disclosure, starting at block 602. It will be readily appreciated that not every method step set forth in this flow diagram is always necessary, and that certain steps of the methods may be combined, performed simultaneously, in a different order, or perhaps omitted, without varying from the scope of the disclosure. FIG. 6 may be employed in whole, or in part, by information handling system 100 depicted in FIG. 1, information handling system 200 depicted in FIG. 2, or any other type of system, controller, device, module, processor, or any combination thereof, operable to employ all, or portions of, the method of FIG. 6.

At block 604, a secured media device is inserted within server and connected to a HBA. In an example, the secured media device may be locked when it is first connected to HBA. At block 606, a key is retrieved and the secured media device is unlocked. In an example, a BMC of the server may perform any suitable operations to retrieve the key for the secured media device. For example, the BMC may receive a key ID from the secured media device, may provide the key ID to a key management system (KMS) in communication with the server. Based on the key ID, the KMS may determine the key for the secured media device and provide the key to the BMC. The BMC may utilize the key from KMS to unlock the secured media device.

At block 608, the BMC may send an integrated service module (iSM) a notification indicating that secured device is unlocked. In certain examples, the notification may be sent via a universal serial bus (USB) network interface card (NIC) (USBNIC) within the server. In an example, the notification may include any suitable data for identifying HBA corresponding to the secured media device. For example, the notification may include, but is not limited to, a vendor specific transmission control protocol (TCP) packet containing the HBA BDF details for the HBA. Based on the notification, the iSM may identify the HBA associated with the secured media device at block 610.

At block 612, the iSM may send a control signal to a HBA driver. In an example, the control signal may be any suitable control signal including, but not limited to, an input/output control (IOCTL) signal. In certain examples, the IOCTL signal may cause an OS to perform I/O operations for the secured media device, and the I/O operations of IOCTL may be different than operations resulting from regular read or write calls. At block 614, attach and scan operations are reinstated, and the method ends at block 616. In an example, the reinstating of the attach and scan operations for the secured device may be implemented by the HBA driver. In an example, the attach and scan operations may result in the OS rescanning the secured media device to determine whether the device is usable by the OS. Based on the secured media device being accessible by the OS, the secured media device may provide a signal and/or data to the OS.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a host bus adaptor (HBA) to receive a secured media device;
   a processor to execute an operating system; and
   a baseboard management controller to communicate with the HBA and with the processor, and after the operating system is booted to:
      detect a hot plug insertion of the secured media device into the information handling system;
      retrieve a key for the secured media device;
      in response to the retrieving the key, unlock the secured media device; and
      trigger an enumeration of the secured media device;
   wherein in response to the trigger, an HBA driver of the processor to enumerate the secured media device.

2. The information handling system of claim 1, further comprising:
   a basic input/output system (BIOS) to receive a system management interrupt (SMI) from the baseboard management controller, and in response to the reception of the SMI the BIOS to trigger a SMI handler; and
   the SMI handler to generate a bus enumeration event for a corresponding host bus adaptor.

3. The information handling system of claim 2, wherein the SMI is a unique SMI to enumeration of the secured media device.

4. The information handling system of claim 2, wherein the baseboard management controller further to provide HBA details to the BIOS, wherein the bus enumeration event is associated with a corresponding HBA.

5. The information handling system of claim 4, further comprising:
   HBA firmware within the BIOS, the HBA firmware to verify that the secured media device is unlocked, and to validate a notification from the baseboard management controller.

6. The information handling system of claim 5, wherein the HBA firmware further to trigger a device insertion event, wherein the triggering of the device insertion event is within a host operating system.

7. The information handling system of claim 1, wherein the secured media device is a self encrypting drive.

8. A method comprising:
   booting an operating system on an information handling system; and then
   detecting, by a baseboard management controller, a hot plug insertion of a secured media device into the information handling system;
   retrieving, by the baseboard management controller, a key for the secured media device;
   in response to the retrieving of the key, unlocking, by the baseboard management controller, the secured media device;
   triggering, by the baseboard management controller, an enumeration of the secured media device; and
   enumerating, by a host bus adaptor driver, the secured media device.

9. The method of claim 8, wherein the triggering of the enumeration of the secured media device comprises:
   sending, by the baseboard management controller, a system management interrupt (SMI) to a basic input/output system (BIOS);
   in response to receiving the SMI, triggering, by the BIOS, a SMI handler; and
   generating, by the SMI handler, a bus enumeration event for a corresponding host bus adaptor.

10. The method of claim 9, wherein the SMI is a unique SMI to enumeration of the secured media device.

11. The method of claim 10, further comprising:
   providing, by the baseboard management controller, host bus adaptor (HBA) details to the BIOS, wherein the bus enumeration event is associated with the corresponding HBA.

12. The method of claim 11, further comprising:
   verifying, by host bus adaptor (HBA) firmware, that the secured media device is unlocked; and
   validating, by the HBA firmware, a notification from the baseboard management controller.

13. The method of claim 12, further comprising:
   triggering, by the HBA firmware, a device insertion event, wherein the triggering of the device insertion event is within a host operating system.

14. The method of claim 9, wherein the secured media device is a self encrypting drive.

15. A method comprising:
   booting an operating system on an information handling system;
   after the operating system is booted:
      detecting, by a baseboard management controller, a hot plug insertion of a secured media device into the information handling system;
      retrieving, by the baseboard management controller, a key for the secured media device;
      in response to the retrieving of the key, unlocking, by the baseboard management controller, the secured media device;
      triggering, by the baseboard management controller, an attach and scan operation of the secured media device; and
      scanning the secured media device.

16. The method of claim 15, wherein the triggering of the attach and scan operation of the secured media device comprises:
   sending, by the baseboard management controller, information for a host bus adaptor (HBA) associated with the secured media device to a service module;
   identifying, by the service module, the HBA associated with the secured media device; and
   sending, by the service module, an input/output control to a HBA driver.

17. The method of claim 15, wherein the scanning of the secured media device comprises:

detecting, by the HBA driver, whether the secured media device is unlocked and accessible by an operating system of the information handling system.

18. The method of claim 15, wherein the triggering of the attach and scan operation is a virtual hot plug event for the secured media device.

19. The method of claim 15, further comprising:
unlocking, by the service module, the secured media device.

20. The method of claim 15, wherein the secured media device is a self encrypting drive.

\* \* \* \* \*